(12) United States Patent
Torrenegra et al.

(10) Patent No.: US 11,176,152 B2
(45) Date of Patent: Nov. 16, 2021

(54) JOB MATCHING METHOD AND SYSTEM

(71) Applicant: Torre Labs, Inc., San Francisco, CA (US)

(72) Inventors: Alex Henriquez Torrenegra, San Francisco, CA (US); Ana Maria Diaz, Bogota (CO); David Montaño, Bogota (CO); Rodrigo Herrero, Armenia (CO)

(73) Assignee: Torre Labs, Inc., Napa, CA (US)

( * ) Notice: Subject to any disclaimer, the term of this patent is extended or adjusted under 35 U.S.C. 154(b) by 310 days.

(21) Appl. No.: 16/250,990

(22) Filed: Jan. 17, 2019

(65) Prior Publication Data

US 2019/0236065 A1      Aug. 1, 2019

Related U.S. Application Data

(60) Provisional application No. 62/623,195, filed on Jan. 29, 2018.

(51) Int. Cl.
| | | |
|---|---|---|
| *G06F 16/00* | (2019.01) | |
| *G06F 16/248* | (2019.01) | |
| *G06F 16/242* | (2019.01) | |
| *G06F 3/0488* | (2013.01) | |
| *G06F 16/2457* | (2019.01) | |
| *G06Q 10/06* | (2012.01) | |

(52) U.S. Cl.
CPC ........ *G06F 16/248* (2019.01); *G06F 3/04883* (2013.01); *G06F 16/2428* (2019.01); *G06F 16/24578* (2019.01); *G06Q 10/063112* (2013.01)

(58) Field of Classification Search
CPC .............. G06F 16/248; G06F 16/2428; G06F 3/04883; G06F 16/24578; G06Q 10/1053
See application file for complete search history.

(56) References Cited

U.S. PATENT DOCUMENTS

| | | | |
|---|---|---|---|
| 2002/0111843 A1 | 8/2002 | Wellenstein | |
| 2004/0030566 A1 | 2/2004 | Brooks Rix | |
| 2008/0222133 A1* | 9/2008 | Au | ........ G06F 16/951 |
| 2010/0114789 A1* | 5/2010 | Dane | ........ G06Q 10/06 |
| | | | 705/321 |

(Continued)

FOREIGN PATENT DOCUMENTS

| | | | |
|---|---|---|---|
| AU | 200138955 A1 | 11/2001 | |
| WO | WO-2010124334 A1 * | 11/2010 | ...... G06Q 10/10 |

(Continued)

*Primary Examiner* — Augustine K. Obisesan
(74) *Attorney, Agent, or Firm* — Gordon & Jacobson, P.C.

(57) ABSTRACT

A computer-implemented method and system is provided that involves storing job-descriptor data for a plurality of job openings and processing the job descriptor data to derive and store words or root forms or synonyms corresponding thereto. A job seeker user interacts with the system to review at least one job opening, which involves the user classifying at least one word or text phrase of the job-descriptor data for the at least one job opening, deriving and storing words or root forms or synonym corresponding to the at least one word or text phrase classified by the user, and ranking a set of job openings based upon scores for the set of job openings, where the scores are based on frequencies of the at least one word or text phrase classified by the user. Other features and aspects are described and claimed.

11 Claims, 16 Drawing Sheets

(56) References Cited

U.S. PATENT DOCUMENTS

| | | |
|---|---|---|
| 2012/0215795 A1 | 8/2012 | Phelon et al. |
| 2014/0122355 A1* | 5/2014 | Hardtke ............... G06Q 10/105 |
| | | 705/321 |
| 2014/0358810 A1 | 12/2014 | Hardtke et al. |
| 2015/0317608 A1* | 11/2015 | Goel ................. G06Q 10/1053 |
| | | 705/319 |
| 2016/0300191 A1 | 10/2016 | Leslie |
| 2017/0154313 A1* | 6/2017 | Duerr .................... G06F 16/248 |
| 2017/0161686 A1 | 6/2017 | Dryvig |
| 2018/0181915 A1* | 6/2018 | Chen ..................... G06F 16/353 |
| 2019/0188647 A1* | 6/2019 | Gariel .................. G06F 16/955 |

FOREIGN PATENT DOCUMENTS

| | | | |
|---|---|---|---|
| WO | WO2013/029152 A1 | 3/2013 | |
| WO | WO-2017152051 A1 * | 9/2017 | ....... G06F 16/24578 |

* cited by examiner

Job title

Logo and company name

Label 1 = "Summary"
- Descriptor 1
- Descriptor 2

Label 2
- Descriptor 1
- Descriptor 2

...

Label n
- Descriptor 1
- Descriptor 2

FIG. 5A

User is interested in:
- *"Work from home for 90% of the work-hours."* at Summary.
- *"Established in 2000, Atrilogy Solutions Group, Inc. provides organizations of all sizes with high-quality, cost effective information technology (IT) and business process consulting & staffing services."* at Company.

JOB MATCHING METHOD AND SYSTEM

CROSS-REFERENCE TO RELATED APPLICATION(S)

The present disclosure claims priority from U.S. Provisional Patent Appl. No. 62/623,195, filed on Jan. 29, 2018, herein incorporated by reference in its entirety.

BACKGROUND

1. Field

The present disclosure relates to computer software. In particular, it relates to a technique for enhancing job search results for job seekers looking for jobs.

2. State of the Art

A challenge common to most companies seeking talented employees is finding the best set of candidates for the position available. One standard practice among human resource departments is to create a job description for each open position, then advertise the position along with the description. Recruiters and job seekers then have to review and analyze these descriptions in order to determine a match between job seekers and particular jobs.

A number of searching tools are available to a person searching on the Internet for the right job based on his or her' skill set. Typical searching tools currently available require the job seeker to select various criteria in the form of keywords, such as desired locations, types of jobs, desired compensation levels, etc. Similarly, the employers provide, in addition to the job description, levels of skill, education, years of experience, etc. required to be considered for a particular job. Searching tools then look up the seeker's keywords in a database of job descriptions and return, or display those job descriptions that contain the job seeker's keywords.

However, available search tools still either often require the employer and the job seeker to each sift through a large number of so-called search results or can return no search results at all if the criteria provided is too specific or narrow.

SUMMARY

The present disclosure provides a job matching search tool and method that more intelligently matches job seekers to potential jobs and intelligently assists in narrowing a job seeker's search for the right job.

In one aspect, a method and system for matching job seekers to jobs or employment opportunities is disclosed. The method (and corresponding system) involves storing job-descriptor data for each job opening of a plurality of job openings. The job-descriptor data for a given job opening can represent one or more words or text phrases related to the given job opening. The job-descriptor data for each job opening is processed to derive and store words or root forms or synonyms corresponding to the job descriptor data of each job opening of the plurality of job openings. A user interacts with the system to review at least one job opening belonging to the plurality of job openings, which involves the user classifying at least one word or text phrase (preferably as belonging to an "interested" type or a "not-interested" type) of the job-descriptor data for the at least one job opening. The at least one word or text phrase classified by the user is processed to derive and store words or root forms or synonyms corresponding to the at least one word or text phrase classified by the user. A set of job openings that belong to the plurality of job openings is ranked based upon scores generated for each job opening of the set of job openings. The score for a given job opening is generated by matching the words or root forms or synonyms corresponding to the at least one word or text phrase classified by the user to the words or root forms or synonyms corresponding to the words or text phrases represented by the job descriptor data of the given job opening. The user can classify a particular word or text phrase of the job descriptor data by performing a predefined swipe gesture associated with the particular word or text phrase. Other features and aspects are described and claimed.

In embodiments, the at least one computer processor of the system can be configured to include modules that perform other parts of the method as described and claimed in the present disclosure.

In another aspect, a computer-implemented method is provided that stores storing job-descriptor data for a job opening, wherein the job-descriptor data represents a plurality of words or text phrases related to the job opening. The method further includes interacting with a user to review the job opening, which involves displaying the job-descriptor data representing a plurality of words or text phrases related to the job opening and classifying a particular subset of the plurality of words or text phrases represented by the job descriptor data for the job opening based upon detecting a user supplied swipe gesture associated with the particular subset of the plurality of words or text phrases.

In embodiments, the interaction with the user can classify different subsets of the plurality of words or text phrases represented by the job descriptor data for the job opening based upon detecting a plurality of user supplied swipe gestures associated with the different subsets of the plurality of words or text phrases. The resulting classifications for the different subsets of the plurality of words or text phrases can be used to rank a plurality of stored job openings.

In embodiments, the plurality of user supplied swipe gestures can include a first-type swipe gesture (e.g., swipe-left gesture) and a second-type swipe gesture (e.g., a swipe-right gesture), wherein the first-type swipe gesture classifies a particular subset of the plurality of words or text phrases associated with the first-type swipe gesture as being of interest to the user, and wherein the second-type swipe gesture classifies a particular subset of the plurality of words or text phrases associated with the second-type swipe gesture as being of no interest to the user.

In embodiments, the user interaction can be repeated to review a plurality of different job openings, and the subsets of the plurality of words or text phrases as classified by such user interaction can be aggregated for one or more classification types and the resulting aggregated data used to rank a plurality of stored job openings.

In embodiments, the subsets of the plurality of words or text phrases of the plurality of job openings can be associated with a set of labels for different aspects of the plurality of job openings, and the subsets of the plurality of words or text phrases as classified by user interaction can be aggregated for one or more classification types on a per-label basis over the set of labels and the resulting aggregated data used to rank a plurality of stored job openings.

In other aspects, parts or all of the methods as described and claimed in the present disclosure can be embodied in a machine or computer readable storage medium including instructed, which when executed on the machine or computer, cause the machine or computer to carry out such method steps.

This summary is intended to provide an overview of subject matter of the present disclosure. It is not intended to provide an exclusive or exhaustive explanation of the inventions described herein. The detailed description is included to provide further information about the present disclosure.

BRIEF DESCRIPTION OF THE DRAWINGS

Various embodiments are disclosed in the following detailed description. The disclosure will be better understood when consideration is given to the following detailed description taken in conjunction with the accompanying drawing figures wherein:

FIG. 5A is a schematic diagram of the job descriptor data for an illustrative job opening.

DETAILED DESCRIPTION OF THE PREFERRED EMBODIMENTS

In the following, a detailed description of examples will be given with references to the drawings. It should be understood that various modifications to the examples may be made. In particular, elements of one example may be combined and used in other examples to form new examples.

Many of the examples described herein are provided in the context of a job matching website or system or service. However, the applicability of the inventive subject matter is not limited to job matching websites or system or services.

Figure 1:
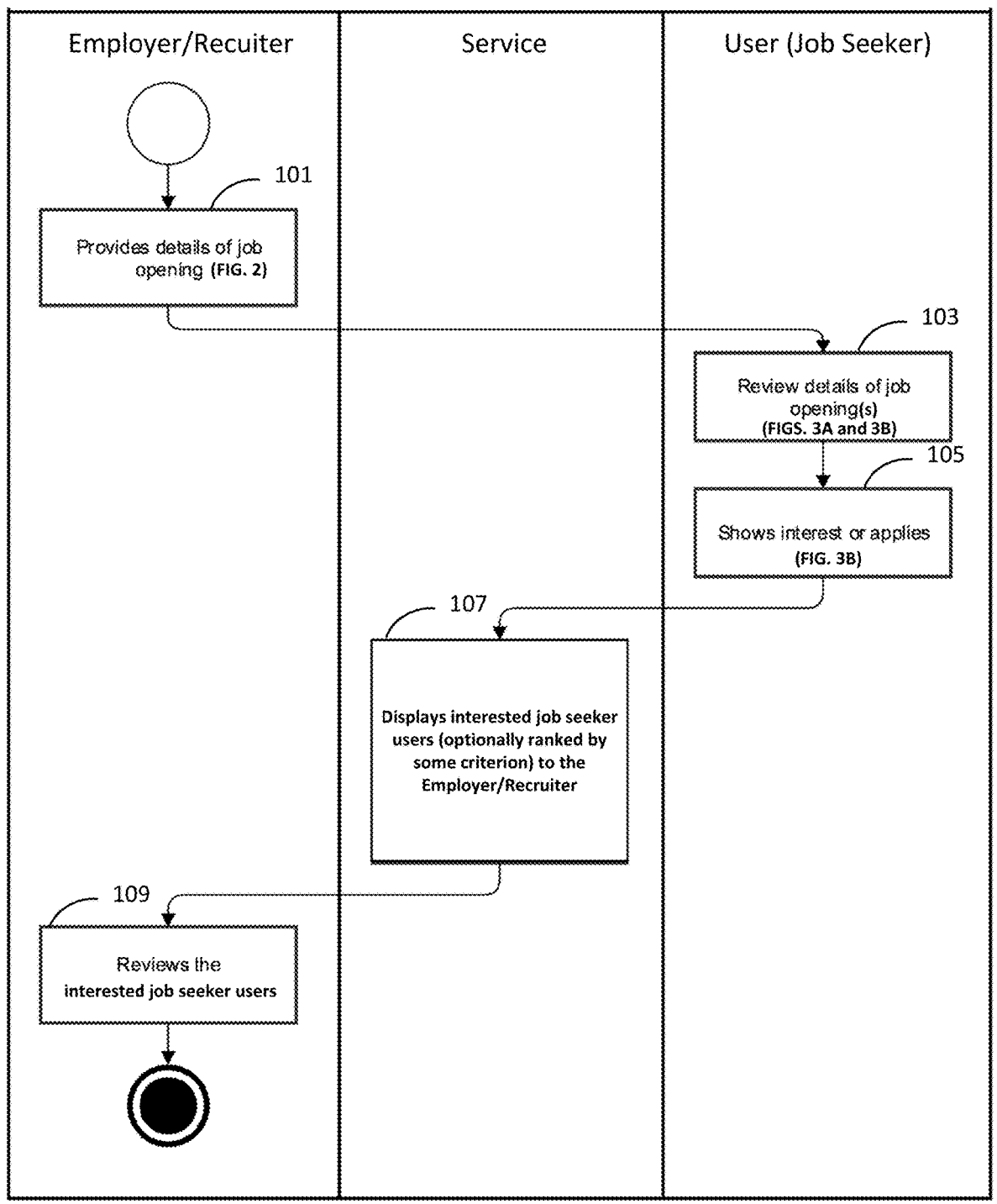
FIG. 1 is a flowchart illustrating one example method of the present disclosure.

FIG. 1 presents a high-level view of a method implemented as part of job matching network system or service according to one example implementation.

In block 101, an employer/recruiter user interacts with the system to provide details of a job opening, which is stored by the system. The operations of block 101 can be repeated many times by a given employer/recruiter user to provide details of multiple job openings of the given employer/recruiter user, which are stored by the system. The operations of block 101 can also be repeated for a number of different employer/recruiter users to provide details of multiple job openings for the different employer/recruiter users, which are stored by the system.

In block 103, a job seeker user interacts with the system to review the details of one or more job opening stored by the system.

In block 105, the job seeker user interacts with the system to show interest in or apply to one or more job opening reviewed in block 103.

The operations of blocks 103 and 105 can be repeated many times by a given job seeker user to allow the given job seeker user to review the details of multiple job openings stored by the system and to show interest in or apply to multiple job openings reviewed in block 103. The operations of blocks 103 and 105 can also be repeated for different job seeker users to allow the different job seeker users to review the details of one or more job openings stored by the system and to show interest in or apply to one or more job openings reviewed in block 103.

In block 107, the system displays to a particular employer/recruiter user a list of interested job seeker users (and possibly related information) who have shown interest in or applied to a job opening submitted by the particular employer/recruiter. In embodiments, the list of interested job seeker users can be ranked by some criterion.

In block 109, the particular employer/recruiter user reviews list of interested job seeker users and possibly the related information.

The operations of blocks 107 and 109 can be repeated many times by a given employer/recruiter user to allow the given employer/recruiter user to review the details of interested job seeker users (and possibly related information) for multiple job openings of the given employer/recruiter user. The operations of blocks 107 and 109 can also be repeated for a number of different employer/recruiter users to allow the different employer/recruiter users to review the details of interested job seeker users (and possibly related information) for the job openings of the different employment/recruiter users.

Figure 2:
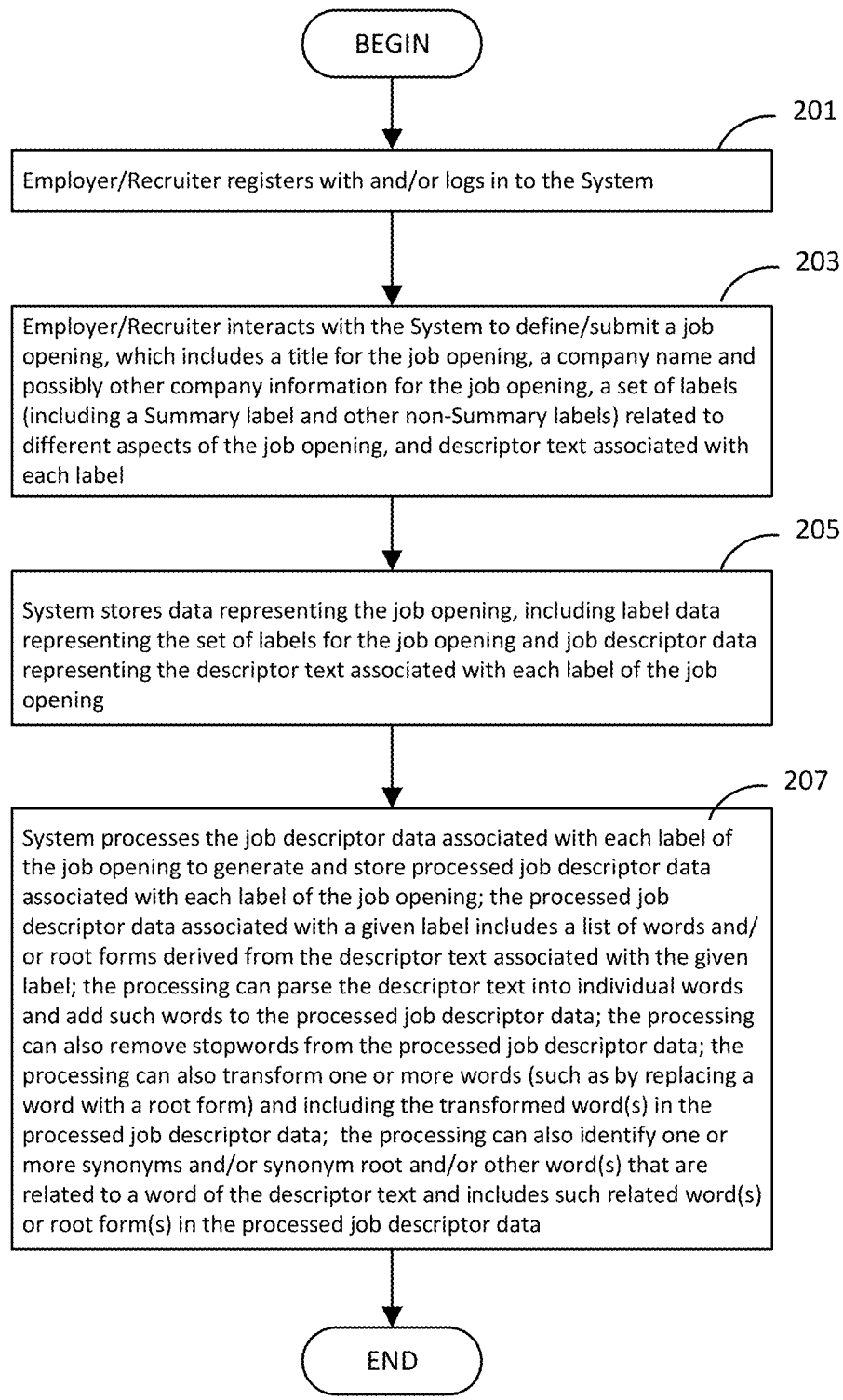
FIG. 2 is a flowchart of one example method where an employer/recruiter user submits a job opening.

FIG. 2 presents a lower-level view of block 101 of FIG. 1.

In block 201, an employer/recruiter user interacts with the system to register and/or login to with the system, which can involve the employer/recruiter user specifying a username and authentication mechanism such as password or other form of authentication (e.g., fingerprint, voice and/or facial verification on a mobile device or two-factor authentication methods).

In step 203, the employer/recruiter user interacts with the system to define/submit a job opening, which includes a title for the job opening, a company name and possibly other company information for the job opening, a set of labels (including a Summary label and other non-Summary labels) related to different aspects of the job opening, and descriptor text associated with each label.

In step 205, the system stores data representing the job opening, including label data representing the set of labels for the job opening and job descriptor data representing the descriptor text (or words or text phrases) associated with each label of the job opening (FIG. 5A). The labels for some of the job descriptor text (such as a job title and company name) can be implied and not stored as part of the data.

Figure 5B:
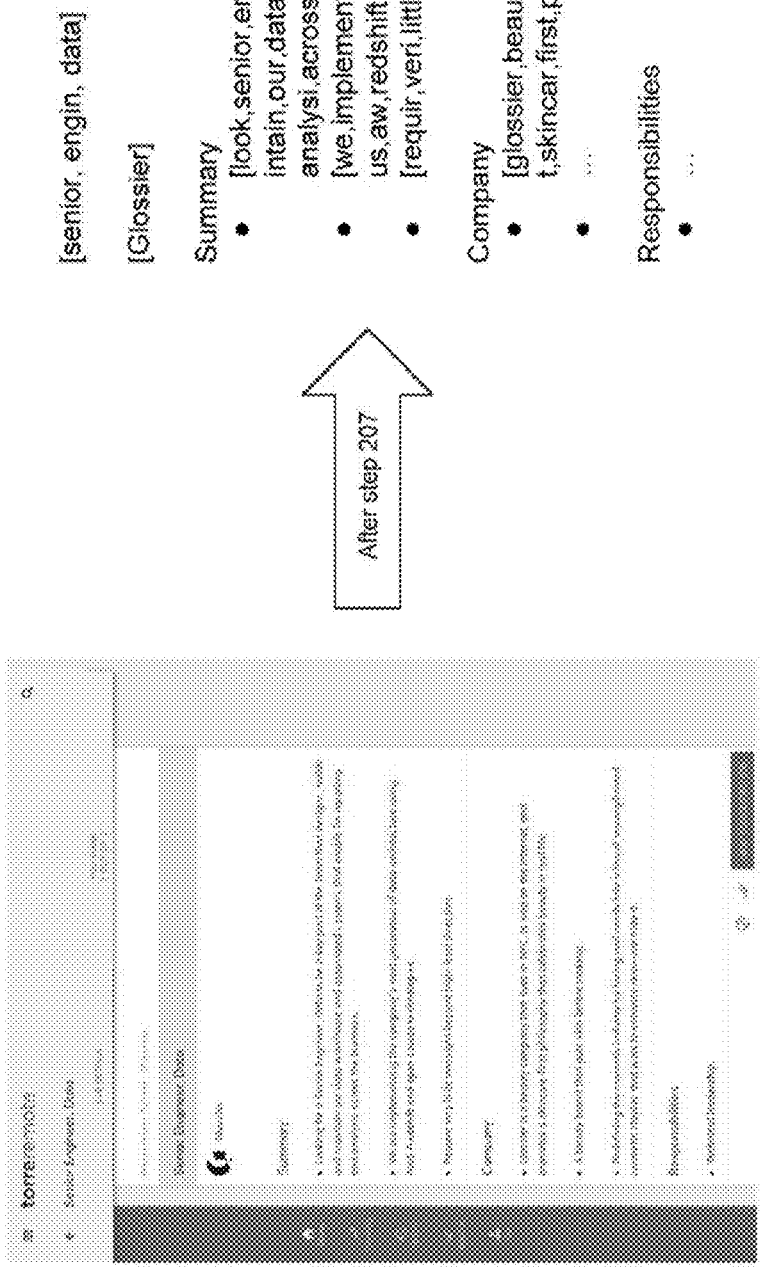
FIG. 5B is a diagram that illustrates exemplary per-label processed job descriptor data that is produced by the processing of job descriptor data of an illustrative job opening as part of block 207 of the method of FIG. 2.

In step 207, the system processes the job descriptor data associated with each label of the job opening to generate and store processed job descriptor data associated with each label of the job opening. The processed job descriptor data associated with a given label includes a list of words and/or root forms derived from the descriptor text (or words or text phrases) associated with the given label (FIG. 5B). The processing can parse the descriptor text into individual words and add such words to the processed job descriptor data. The processing can also remove stop words from the processed job descriptor data. Stop words are natural language words which have very little meaning, such as "and", "the", "a", "an", and similar words. The processing can also transform one or more words (such as by replacing a word with a root form) and including the transformed word(s) in the processed job descriptor data. The processing can also identify one or more synonyms and/or synonym root and/or other word(s) that are related to a word of the descriptor text and includes such related word(s) or root form(s) in the processed job descriptor data.

In alternate embodiments, the job opening data for one or more employer/recruiters can be loaded or otherwise imported for storage by the system by operation of a communication API or batch mode process. As part of this process, the job opening data can possibly be transformed or other reformatted into a format suitable for processing job opening data by the system.

Figure 3A:
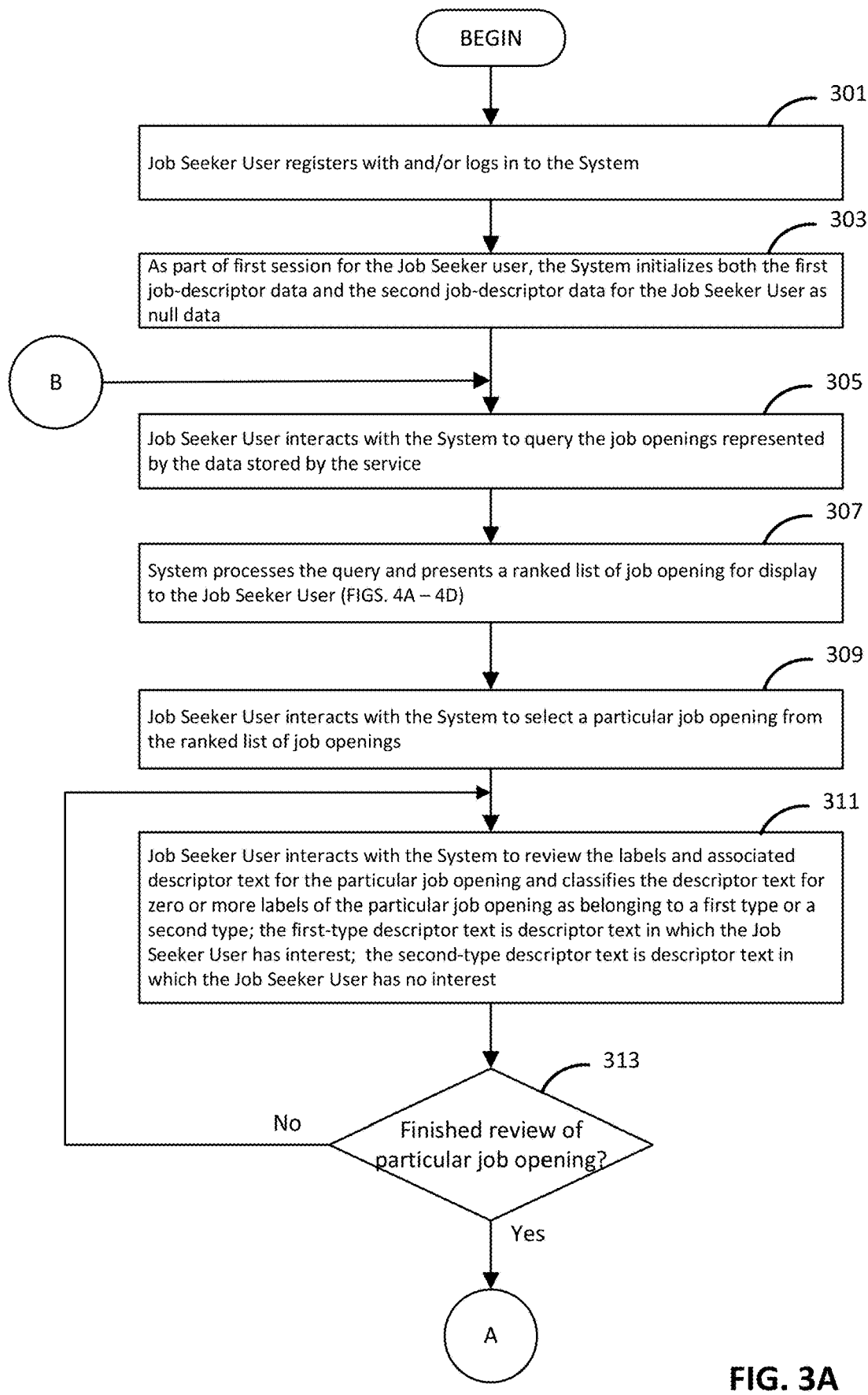
FIGS. 3A and 3B, collectively, is a flowchart of one example method where a job seeker user reviews one or more job openings and possibly classifies descriptor text associated with the labels of the reviewed job opening(s) as belonging to an "interested" type (in which the job seeker user has interest) or to a "not-interested" type (in which the job-seeker user does not have interest).
Figure 3B:
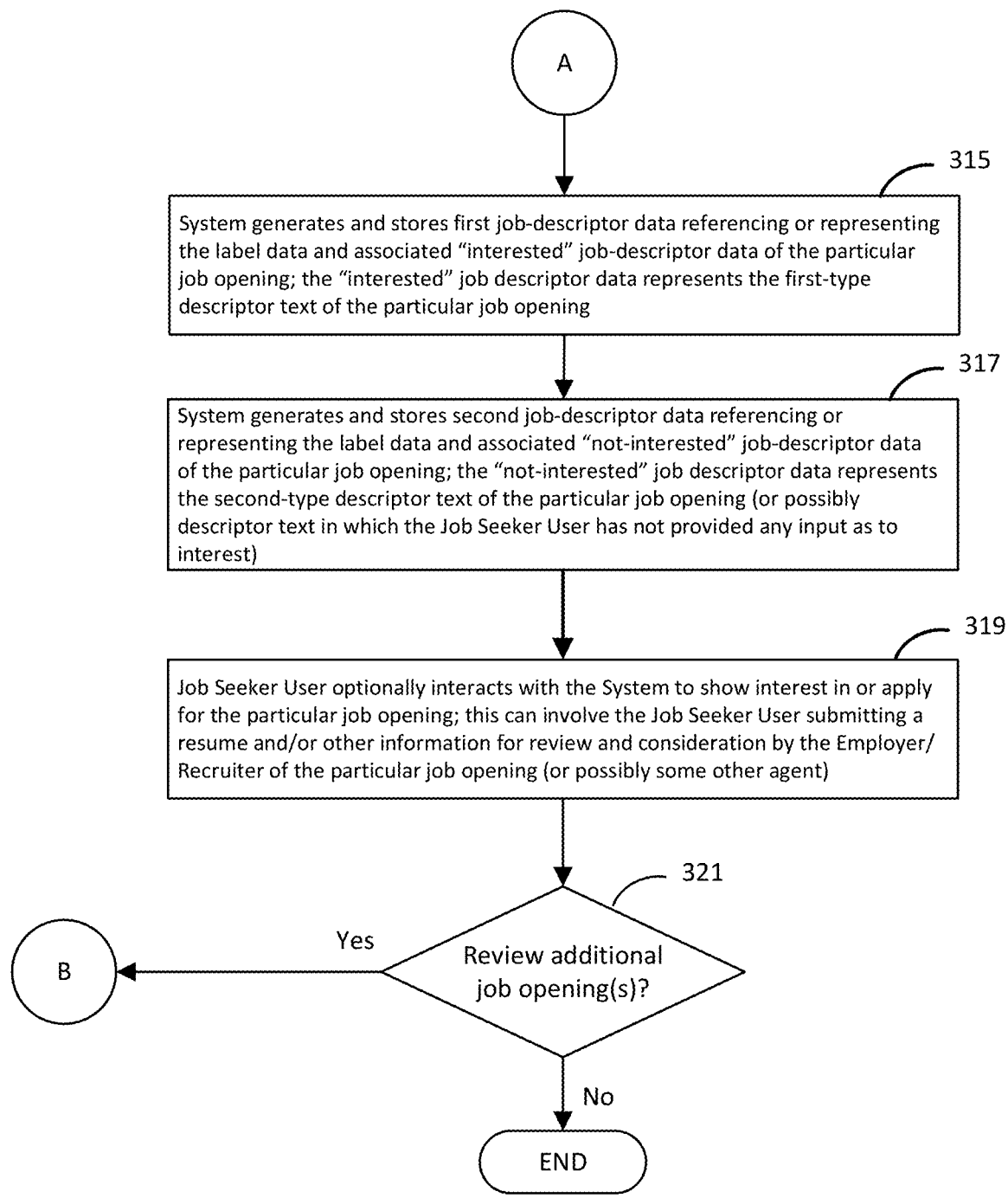
Figure 4A:
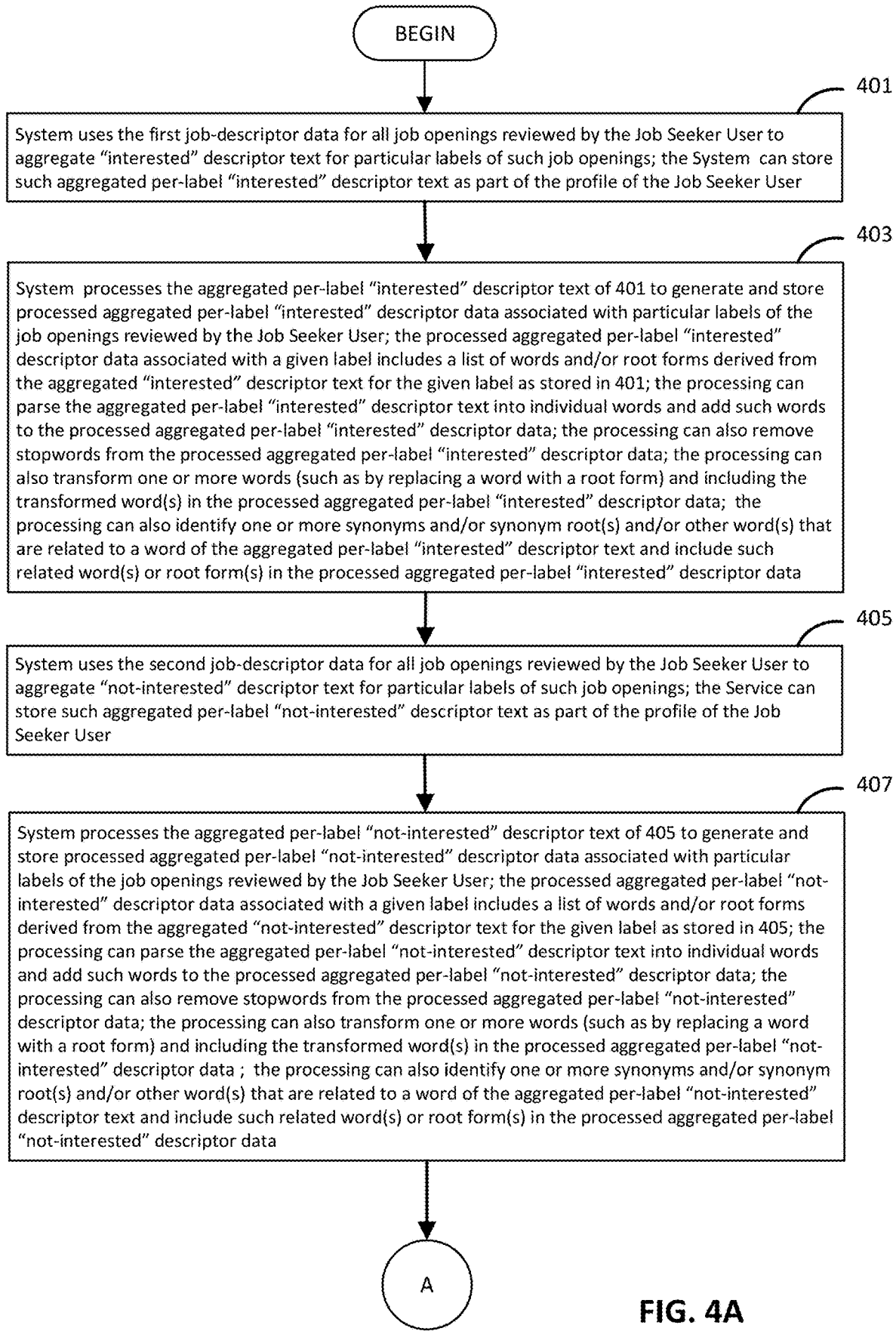
FIG. 4A to 4D, collectively, is a flowchart that uses job descriptor data that reflects the user-specified classifications of the job opening descriptor text to match and rank related job openings for presentation and display and possibly selection for review by the user.
Figure 4B:
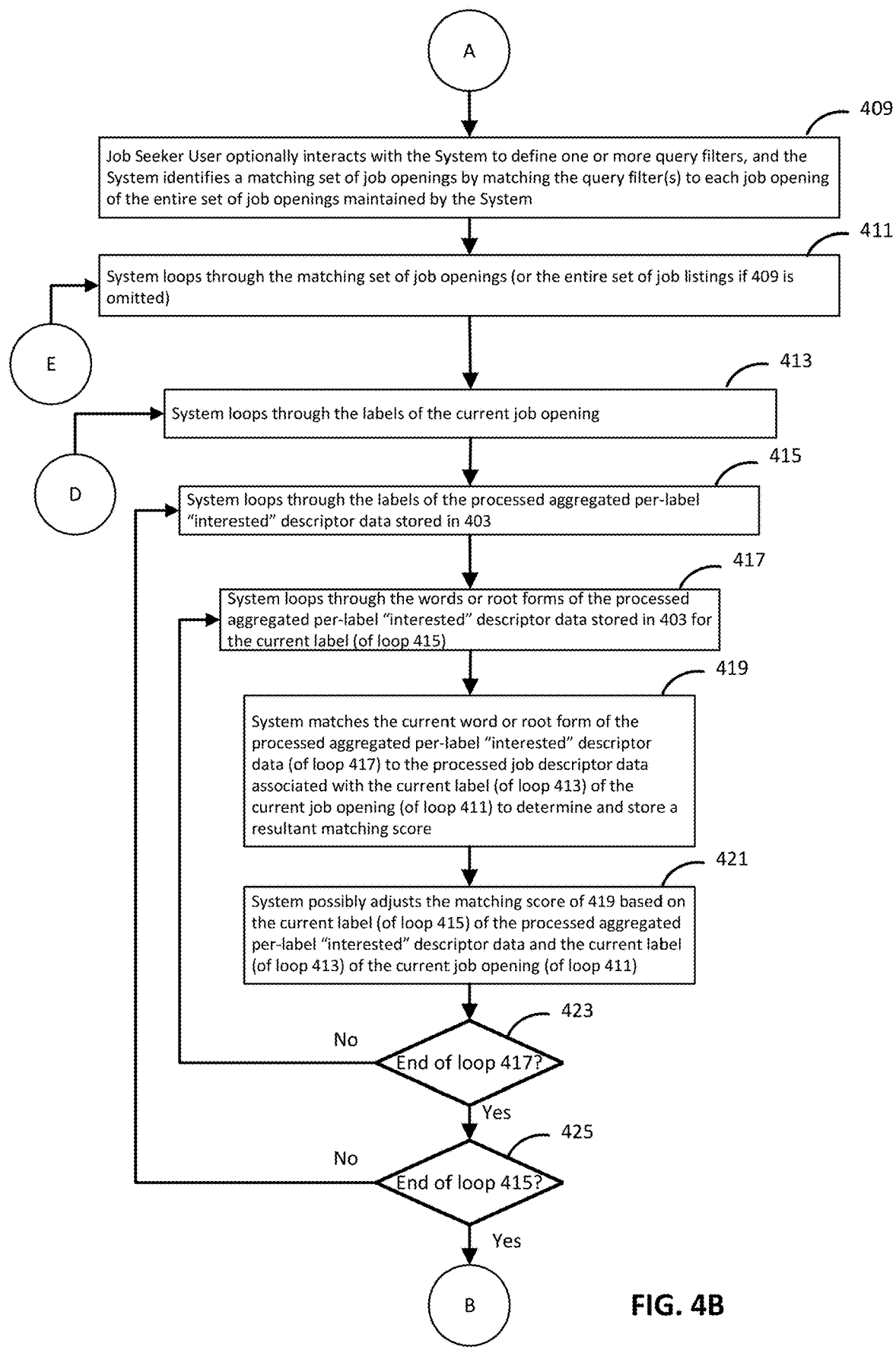
Figure 4C:
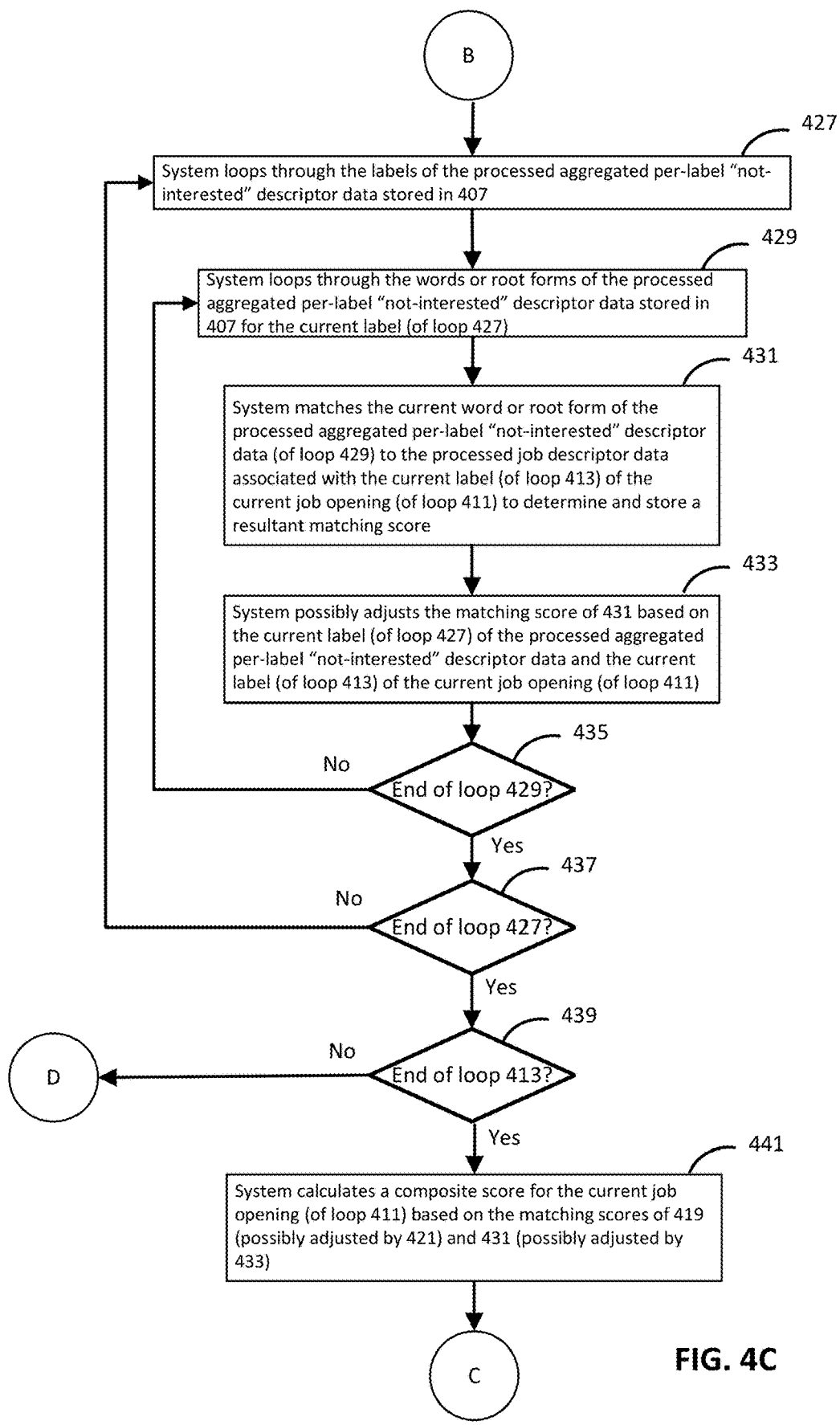
Figure 4D:
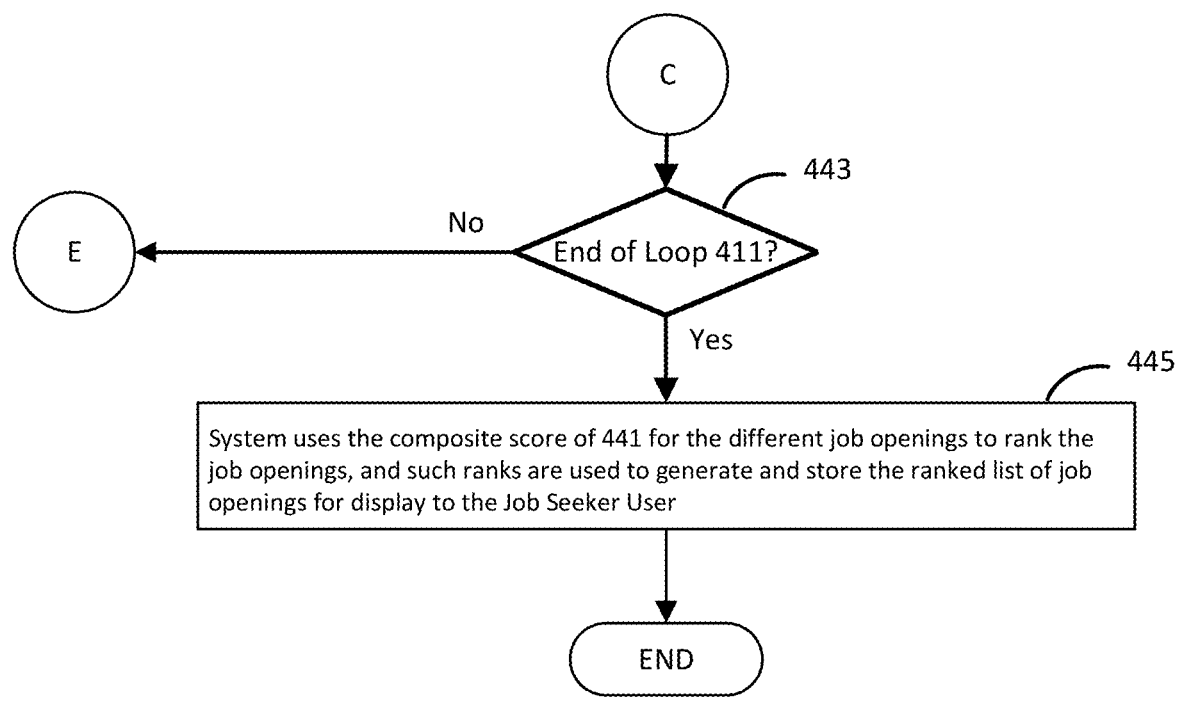

FIGS. 3A and 3B present a lower-level view of blocks 103 and 105 of FIG. 1.

In block 301, a job seeker user registers with and/or logs in to the system, which can involve the job seeker user specifying a username and authentication mechanism such as password or other form of authentication (e.g., fingerprint, voice and/or facial verification on a mobile device or two-factor authentication methods).

In block 303, as part of first session for the job seeker user, the system initializes both the first job-descriptor data and the second job-descriptor data for the job seeker user as null data.

In block 305, the job seeker user interacts with the system to query the job openings represented by the data stored by the system.

In block 307, the system processes the query and presents a ranked list of job openings for display to the job seeker user. Details of the operations of the system in processing the query is described below with respect to FIGS. 4A-4D.

In block 309, the job seeker user interacts with the system to select a particular job opening from the ranked list of job openings. For example, the particular job opening can be selected from a drop-down list by clicking on a representation of the particular job opening or by some other selection mechanism.

Figure 5C:
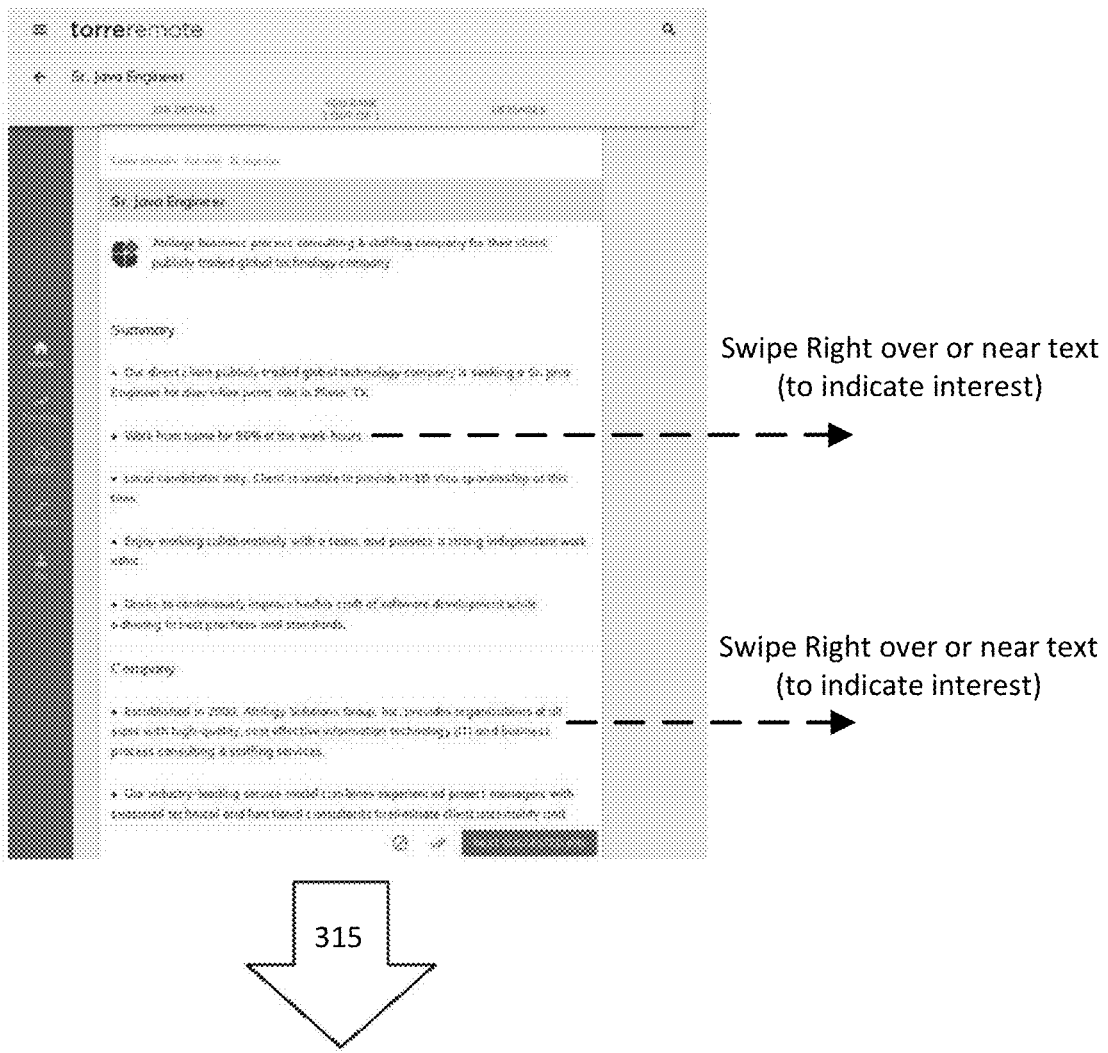
FIG. 5C is a diagram that illustrates "interested" job descriptor data that is produced by user classification of job descriptor data of an illustrative job opening as part of blocks 311 and 315 of the method of FIGS. 3A and 3B.
Figure 5D:
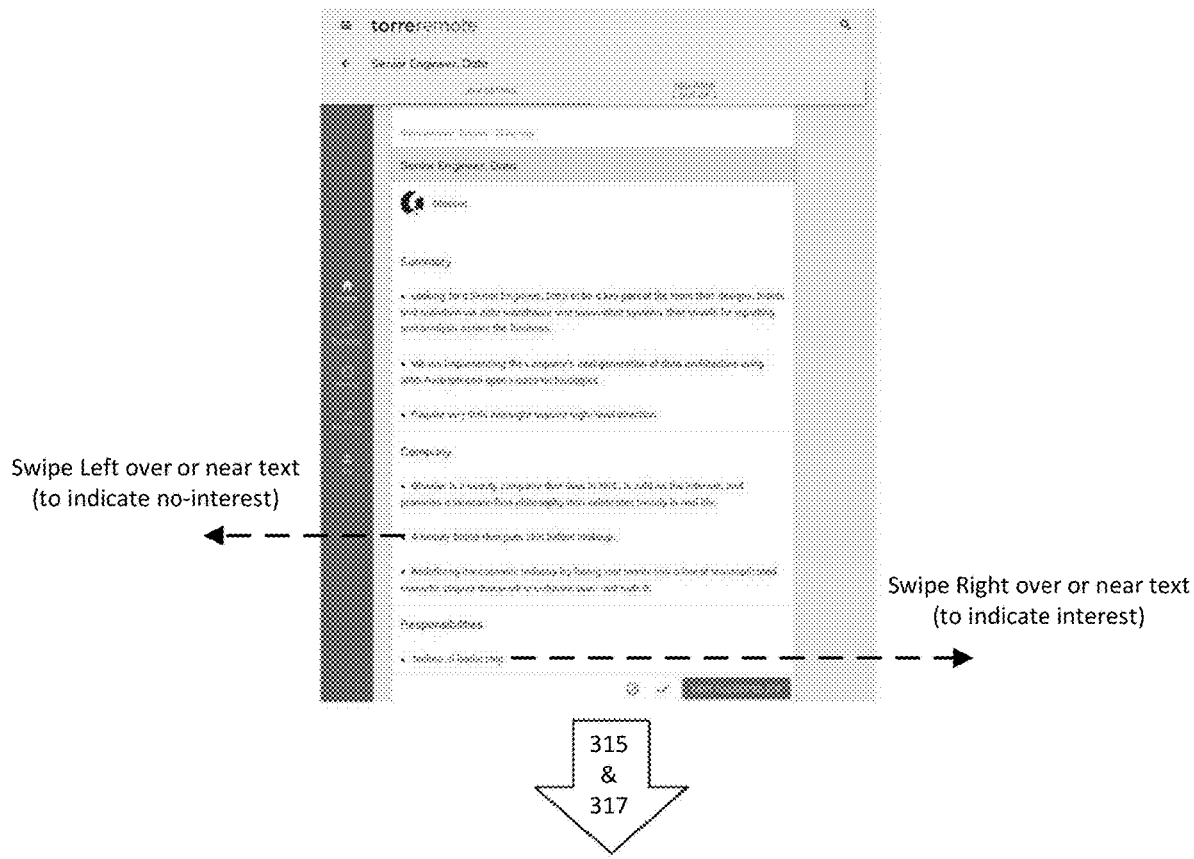
FIG. 5D is a diagram that illustrates "not-interested" job descriptor data that is produced by user classification of job descriptor data of an illustrative job opening as part of blocks 311 and 317 of the method of FIGS. 3A and 3B.

In block 311, the job seeker user interacts with the system to review the labels and associated descriptor text (or words or text phrases) for the particular job opening and to classify the descriptor text (or words or text phrases) for zero or more labels of the particular job opening into one of two types: a first type for descriptor text (or words or text phrases) in which the user has interest, and a second type for descriptor text (or words or text phrases) in which the user has no interest. In embodiments, the job seeker user can possibly classify specific descriptor text as belonging to the first type (e.g., indicate an interest in the specific descriptor text) by a predefined swipe gesture (such as by a right swipe in or next to the screen area that displays the specific descriptor text) or some other user input associated with the specific descriptor text (FIGS. 5C and 5D). Similarly, the job seeker user can possibly classify specific descriptor text as belonging to the second type (e.g., indicate no interest in the specific descriptor text) by another predefined swipe gesture (such as by a left swipe in or next to the screen area that displays the specific descriptor text) or some other user input associated with the specific descriptor text (FIG. 5D).

In block 313, the system determines if the job seeker user has finished review of the labels and associated descriptor text for the particular job opening. If not, the operations revert to block 311 continue such review. If so, the operations continue to block 315.

In block 315, the system generates and stores first job-descriptor data referencing or representing the label data and associated "interested" job-descriptor data of the particular job opening. The "interested" job descriptor data represents the first-type descriptor text of the particular job opening (which is descriptor text in which the job seeker user has indicated interest in as part of block 311) (FIGS. 5C and 5D).

In block 317, the system generates and stores second job-descriptor data referencing or representing the label data and associated "not-interested" job-descriptor data of the particular job opening. The "not-interested" job descriptor data represents the second-type descriptor text of the particular job opening (which is descriptor text in which the job seeker user has indicated no interest in, or possibly has not provided any input as to interest in as part of block 311) (FIG. 5D).

In block 319, the job seeker user optionally interacts with the system to show interest in or apply for the particular job opening. This can involve the job seeker user submitting a resume and/or other information for review and consideration by the employer/recruiter of the particular job opening (or possibly some other agent).

In block 321, the system determines whether the job seeker user desired to review one or more additional job openings. If so, the operations revert to block 305 to repeat the operations of blocks 305 to 321 for one or more additional job openings. If no, the operations end.

FIGS. 4A to 4D present a lower-level view of block 307 of FIG. 3A.

Figure 5E:
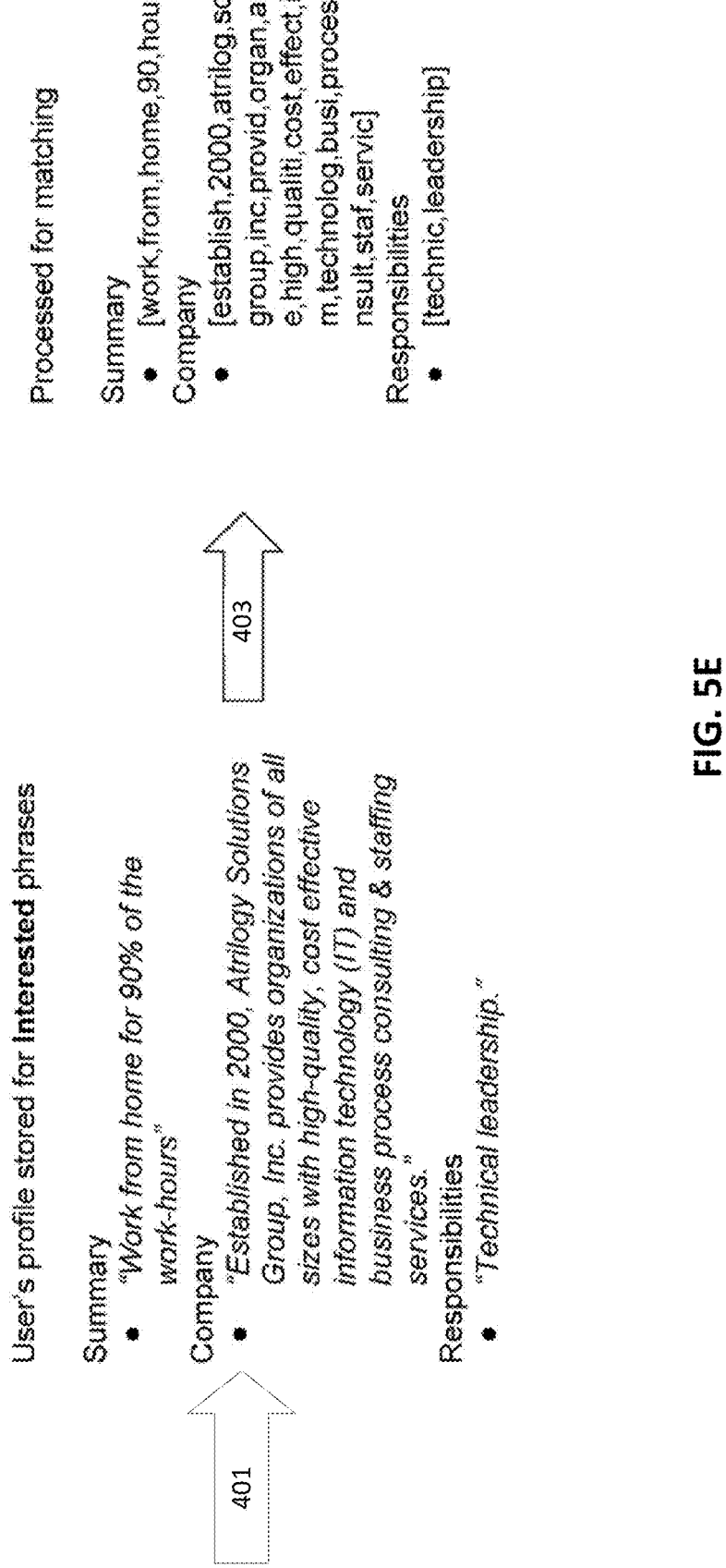
FIG. 5E is a diagram that illustrates exemplary per-label processed "interested" job descriptor data that is produced by the processing of "interested" job descriptor data of a user's profile as part of block 403 of the method of FIG. 4A.

In block 401, the system uses the first job-descriptor data of block 315 for all job openings reviewed by the job seeker user to aggregate "interested" descriptor text for particular labels of such job openings. The system can store such aggregated per-label "interested" descriptor text as part of the profile of the job seeker user (FIG. 5E).

In block 403, the system processes the aggregated per-label "interested" descriptor text of 401 to generate and store processed aggregated per-label "interested" descriptor data associated with particular labels of the job openings reviewed by the job seeker user. The processed aggregated per-label "interested" descriptor data associated with a given label includes a list of words and/or root forms and/or synonyms derived from the aggregated "interested" descriptor text for the given label as stored in 401. In embodiments, the processing can parse the aggregated per-label "interested" descriptor text into individual words and add such words to the processed aggregated per-label "interested" descriptor data. The processing can also remove stopwords from the processed aggregated per-label "interested" descriptor data. The processing can also transform one or more words (such as by replacing a word with a root form) and including the transformed word(s) in the processed aggregated per-label "interested" descriptor data. The processing can also identify one or more synonyms and/or synonym root(s) and/or other word(s) that are related to a word of the aggregated per-label "interested" descriptor text and include such related word(s) or root form(s) or synonym(s) in the processed aggregated per-label "interested" descriptor data (FIG. 5E).

Figure 5F:
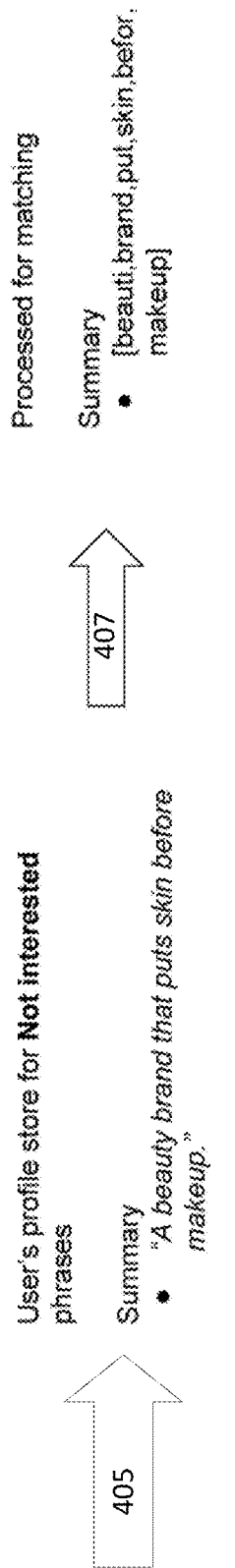
FIG. 5F is a diagram that illustrates exemplary per-label processed "not-interested" job descriptor data that is produced by the processing of "not-interested" job descriptor data of a user's profile as part of block 407 of the method of FIG. 4A.

In block 405, the system uses the second job-descriptor data of block 317 for all job openings reviewed by the job seeker user to aggregate "not-interested" descriptor text for particular labels of such job openings. The system can store such aggregated per-label "not-interested" descriptor text as part of the profile of the job seeker user (FIG. 5F).

In block 407, the system processes the aggregated per-label "not-interested" descriptor text of 405 to generate and store processed aggregated per-label "not-interested" descriptor data associated with particular labels of the job openings reviewed by the job seeker user. The processed aggregated per-label "not-interested" descriptor data associated with a given label includes a list of words and/or root forms and/or synonyms derived from the aggregated "not-interested" descriptor text for the given label as stored in 405. In embodiments, the processing can parse the aggregated per-label "not-interested" descriptor text into individual words and add such words to the processed aggregated per-label "not-interested" descriptor data. The processing can also remove stopwords from the processed aggregated per-label "not-interested" descriptor data. The processing can also transform one or more words (such as by replacing a word with a root form) and including the transformed word(s) in the processed aggregated per-label "not-interested" descriptor data. The processing can also identify one or more synonyms and/or synonym root(s) and/or other word(s) that are related to a word of the aggregated per-label "not-interested" descriptor text and include such related word(s) or root form(s) or synonym(s) in the processed aggregated per-label "not-interested" descriptor data.

In block 409, the job seeker user optionally interacts with the system to define one or more query filters, and the system identifies a matching set of job openings by matching the query filter(s) to each job opening of the entire set of job openings maintained by the system.

In block 411, the system configures a loop through the matching set of job openings (or the entire set of job listings if 409 is omitted).

In block 413, the system configures a nested loop through the labels of the current job opening.

In block 415, the system configures another nested loop through the labels of the processed aggregated per-label "interested" descriptor data stored in 403.

In block 417, the system configures yet another nested loop through the words or root forms or synonyms of the processed aggregated per-label "interested" descriptor data stored in 403 for the current label (of loop 415).

In block 419, the system matches the current word or root form or synonym of the processed aggregated per-label "interested" descriptor data (of loop 417) to the processed job descriptor data associated with the current label (of loop 413) of the current job opening (of loop 411) to determine and store a resultant matching score. In embodiments, the matching process can generate the matching score based on the frequency of the current word or root form or synonym appearing in the processed job descriptor data. For example, an adaption of the Okapi BM25 methodology can be used where the matching score is based on the frequency of a query term (in this case, the current word or root form of the processed aggregated per-label "interested" descriptor data) appearing in the processed job descriptor data. The score can be calculated:

$$\text{score }(D, Q) = IDF(Q) \cdot \frac{f(Q, D) \cdot (k_1 + 1)}{f(Q, D) + k_1 \cdot \left(1 - b + b \cdot \frac{|D|}{avgdl}\right)} \quad \text{Eqn. (1)}$$

where D is the processed job descriptor data,
Q is the query term, in this case, the current word or root form of the processed aggregated per-label "interested" descriptor data,
f(Q, D) is the frequency of the query term Q in D,
|D| is the length of D in words,
avgdl is the average length of D in the processed job descriptor data, and
$k_1$ and b are free parameters, usually chosen, in absence of an advanced optimization, as $k_1 \in [1.2, 2.0]$ and b=0.75.

In Eqn. (1), IDF(Q) can be given as:

$$IDF(Q) = \log \frac{N - n(Q) + 0.5}{n(Q) + 0.5} \quad \text{Eqn. (2)}$$

where N is the total number of processed job descriptor data items, and
n(Q) is the number of processed job descriptor data items containing Q.

In block 421, the system possibly adjusts the matching score of 419 based on the current label (of loop 415) of the processed aggregated per-label "interested" descriptor data and the current label (of loop 413) of the current job opening (of loop 411). For example, the matching score of 419 can be doubled (or possibly multiplied by some positive weight factor greater than 1) in the event that both the current label of loop 415 and the current label of loop 413 refers to a "Summary" label. In this manner, the score for a matching word or term found in the Summary labels is doubled (or possibly multiplied by some positive weight factor greater than 1).

In block 423, the system determines if the end of loop of 417 has been reached. If not, the operations revert back to block 417 to repeat the next iteration of the loop for the next word or root form of the processed aggregated per-label "interested" descriptor data. If so, the operations continue to block 425.

In block 425, the system determines if the end of loop of 415 has been reached. If not, the operations revert back to block 415 to repeat the next iteration of the loop for the next label of the processed aggregated per-label "interested" descriptor data. If so, the operations continue to block 427.

In block 427, the system configures another nested loop through the labels of the processed aggregated per-label "not-interested" descriptor data stored in 407.

In block 429, the system configures yet another nested loop through the words or root forms or synonyms of the processed aggregated per-label "not-interested" descriptor data stored in 407 for the current label (of loop 427).

In block 431, the system matches the current word or root form or synonym of the processed aggregated per-label "not-interested" descriptor data (of loop 429) to the processed job descriptor data associated with the current label (of loop 413) of the current job opening (of loop 411) to determine and store a resultant matching score. In embodiments, the matching process can generate the matching score based on the frequency of the current word or root form or synonym appearing in the processed job descriptor data. For example, an adaption of the Okapi BM25 methodology can be used the matching process as described above.

In block 433, the system possibly adjusts the matching score of 431 based on the current label (of loop 427) of the processed aggregated per-label "not-interested" descriptor data and the current label (of loop 413) of the current job opening (of loop 411). For example, the matching score of 431 can be doubled (or possibly multiplied by some positive weight factor greater than 1) in the event that both the current label of loop 427 and the current label of loop 413 refers to a "Summary" label. In this manner, the score for a matching word or term found in the Summary labels is doubled (or possibly multiplied by some positive weight factor greater than 1).

In block 435, the system determines if the end of loop of 429 has been reached. If not, the operations revert back to block 429 to repeat the next iteration of the loop for the next word or root form of the processed aggregated per-label "not-interested" descriptor data. If so, the operations continue to block 437.

In block 437, the system determines if the end of loop of 427 has been reached. If not, the operations revert back to block 427 to repeat the next iteration of the loop for the next label of the processed aggregated per-label "not-interested" descriptor data. If so, the operations continue to block 439.

In block 439, the system determines if the end of loop of 413 has been reached. If not, the operations revert back to block 413 to repeat the next iteration of the loop for the next label of the current job opening. If so, the operations continue to block 441.

In block 441, the system calculates a composite score for the current job opening (of loop 411) based on the matching scores of 419 (possibly adjusted by 421) and 431 (possibly adjusted by 433). In embodiments, the composite score can be calculated by scaling the matching scores of 419 (possibly adjusted by 421) with positive weight factors (>1), scaling the matching scores of 431 (possibly adjusted by 433) with negative weight factors (<−1) and then combining (e.g., adding) the resultant values.

In block 443, the system determines if the end of loop of 411 has been reached. If not, the operations revert back to block 411 to repeat the next iteration of the loop for the next job opening. If so, the operations continue to block 445.

In block 445, the system uses the composite score of 441 for the different job openings to rank the job openings, and such ranks are used to generate and store the ranked list of job openings for display to the job seeker user.

In other embodiments, the ranked list of job openings can be used to identify one or more job openings that are a good match to a job seeker user. The system can generate one or more notifications that lists or refers to the identified job opening(s) and communicate such notification(s) to the job seeker user. Such notification(s) can be embodied by an in-service message, e-mail message, SMS or other form of message. Upon receipt of such notification(s), the user can access the system to display and review the matching job opening(s) identified by the notification(s).

Figure 6:
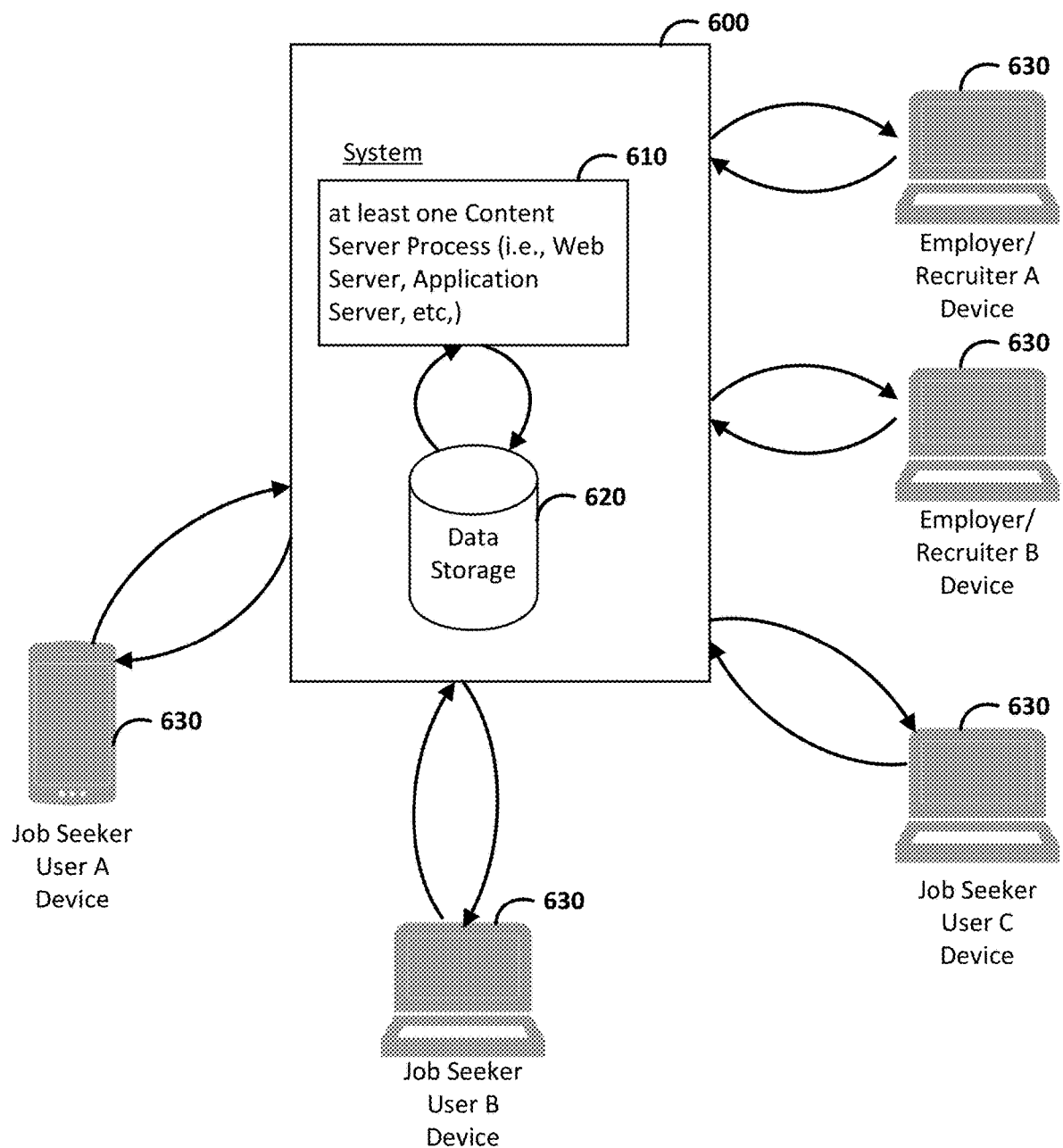
FIG. 6 is a schematic illustration of an example job matching system.

FIG. 6 shows an example job matching system 600 according to one example of the current disclosure. The system 600 may contain a content server process 610. Content server process 610 may communicate with data storage 620 and users through a network. Content server process 610 may be responsible for the retrieval, presentation, and maintenance of registered user profiles stored in data storage 620 and interaction with the job seeker users and employer/recruiter users as described herein in detail. Content server process 610 in one example may include or be a web server that fetches or creates internet web pages, which may include portions of, or all of, a registered user profile at the request of users. The data storage 620 in one example can be provided by a database system, a distributed data storage system, a decentralized network data storage system (such as a distributed ledger or blockchain), or some other suitable form of data storage.

The job seeker users may be an individual, user or member, a prospective user, an agent acting on behalf of an individual or user or some other user. The employer/recruiting users may be an employer, recruiter, potential employer or recruiter, or an agent acting on behalf of such employer or recruiter, or some other interested party. The job seeker users and the employer/recruiting users access the system 600 using a computer system 630 through a network. The network may be any means of enabling the system 600 to communicate data with a computer remotely, such as the internet, an extranet, a LAN, WAN, wireless, wired, or the like, or any combination. The user computer systems 630 can be any one of a number of different types of computer systems, including PCs, workstations, notebooks, tablets, smartphones, other mobile devices, and other data communication enabled computing devices.

Certain embodiments as described herein can include logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
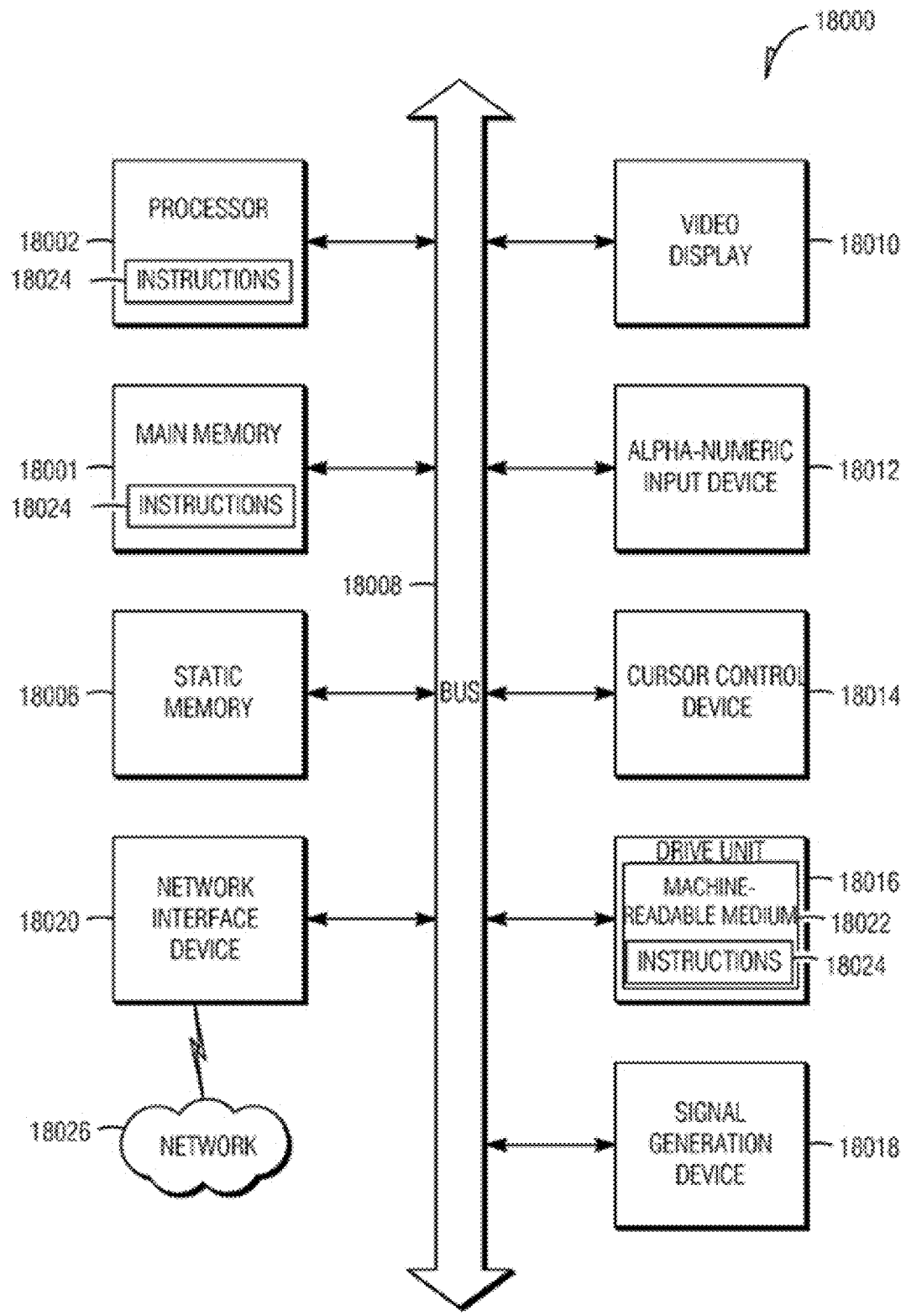
FIG. 7 shows an example computer system.

FIG. 7 shows a diagrammatic representation of a machine in the example form of a computer system 18000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Personal Digital Assistant (PDA), a cellular telephone or smartphone, a Web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 18000 includes a processor 18002 (e.g., a Central Processing Unit (CPU), a Graphics Processing Unit (GPU) or both), a main memory 18001 and a static memory 18006, which communicate with each other via a bus 18008. The computer system 18000 may further include a video display unit 18010 (e.g., a Liquid Crystal Display (LCD) or a Cathode Ray Tube (CRT)). The computer system 18000 also includes an alphanumeric input device 18012 (e.g., a keyboard), a User Interface (UI) cursor controller 18014 (e.g., a mouse), a disk drive unit 18016, a signal generation device 18018 (e.g., a speaker) and a network interface device 18020 (e.g., a transmitter).

The disk drive unit 18016 includes a machine-readable medium 18022 on which is stored one or more sets of instructions 18024 and data structures (e.g., software) embodying or used by one or more of the methodologies or functions illustrated herein. The software may also reside, completely or at least partially, within the main memory 18001 and/or within the processor 18002 during execution thereof by the computer system 18000, the main memory 18001 and the processor 18002 also constituting machine-readable media.

The instructions 18024 may further be transmitted or received over a network 18026 via the network interface device 18020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a non-exclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A computer-implemented method comprising:
   i) storing job-descriptor data for each job opening of a plurality of job openings;
   ii) processing the job-descriptor data for each job opening of i) to derive and store words or root forms or synonyms corresponding to the job descriptor data of each job opening of the plurality of job openings;

iii) interacting with a job seeker user to review at least one job opening belonging to the plurality of job openings, which involves the job seeker user classifying a particular word or text phrase of the job descriptor data for the at least one job opening as one of a first-type and a second-type, wherein the first-type is a word or text phrase in which the job seeker user has an interest and the second-type is a word or text phrase in which the job seeker user does not have an interest;

iv) processing the at least one word or text phrase classified by the job seeker user in iii) to derive and store words or root forms or synonyms corresponding to the at least one word or text phrase classified by the job seeker user, wherein the processing processes at least one first-type word or text phrase to derive and store a first set of words or root forms or synonyms corresponding to the at least one first-type word or text phrase and processes the at least one second-type word or text phrase to derive and store a second set of words or root forms or synonyms corresponding to the at least one second-type word or text phrase;

v) ranking a set of job openings that belong to the plurality of job openings based upon scores generated for each job opening of the set of job openings, wherein the score for a given job opening is generated by matching the words or root forms or synonyms corresponding to the at least one word or text phrase classified by the job seeker user as derived and stored in iv) to the words or root forms or synonyms corresponding to the job descriptor data of the given job opening as derived and stored in ii), wherein the score for the given job opening is based upon a first frequency and a second frequency, wherein the first frequency represents frequency of the first set of words or root forms or synonyms in the words or root forms or synonyms corresponding to the job descriptor data of the given job opening, wherein the second frequency represents frequency of the second set of words or root forms or synonyms in the words or root forms or synonyms corresponding to the job descriptor data of the given job opening, wherein the first frequency contributes to an increase in the score for the given job opening, and wherein the second frequency contributes to a decrease in the score for the given job opening; and vi) presenting to the job seeker user information pertaining to the set of job openings in an order based on the ranking of v) for display and viewing by the job seeker user.

2. A computer-implemented method according to claim 1, further comprising:
interacting with the job seeker user to select a particular job opening belonging to the set of job openings for review by the job seeker user.

3. A computer-implemented method according to claim 1, wherein:
the job-descriptor data for a given job opening represents at least one word or text phrase related to the given job opening.

4. A computer-implemented method according to claim 1, wherein:
the job seeker user classifies a particular word or text phrase of the job descriptor data as one of the first-type and the second-type by performing a pre-defined swipe gesture associated with the particular word or text phrase of the job descriptor.

5. A computer-implemented method according to claim 1, wherein:
the processing of iv) aggregates words or text phrases classified by the job seeker user for a plurality of job openings reviewed by the job seeker user to derive and store words or root forms or synonyms corresponding to aggregated words or text phrases classified by the job seeker user for the plurality of job openings; and in v), the score for a given job opening is generated by matching the words or root forms or synonyms corresponding to the aggregated words or text phrases classified by the job seeker user to the words or root forms or synonyms corresponding to the job descriptor data of the given job opening.

6. A computer-implemented method according to claim 1, wherein:
the job descriptor data for a given job opening is associated with a set of labels for different aspects of the given job opening;

the processing of iv) aggregates on a per-label basis words or text phrases classified by the job seeker user for a plurality of job openings reviewed by the job seeker user to derive and store words or root forms or synonyms corresponding to aggregated per-label words or text phrases classified by the job seeker user for the plurality of job openings; and in v), the score for a given job opening is generated by matching the words or root forms or synonyms corresponding to the aggregated per-label words or text phrases classified by the job seeker user to the words or root forms or synonyms corresponding to the job descriptor data of the given job opening.

7. A computer-implemented method according to claim 1, further comprising:
in v), adjusting the score for a given job opening based upon words or root forms or synonyms corresponding to the aggregated word or text phrases classified by the job seeker user for a particular label matching the words or root forms or synonyms corresponding to another particular label of the job descriptor data of the given job opening.

8. A system comprising:
data storage configured to store job-descriptor data for each job opening of a plurality of job openings;
at least one computer processor that includes:
at least one module configured to process the job-descriptor data for each job opening to derive and store words or root forms or synonyms corresponding to the job descriptor data of each job opening of the plurality of job openings;
at least one module configured to interact with a job seeker user to review at least one job opening belonging to the plurality of job openings, which involves the job seeker user classifying a particular word or text phrase of the job descriptor data for the at least one job opening as one of a first-type and a second-type, wherein the first-type is a word or text phrase in which the job seeker user has an interest and the second-type is a word or text phrase in which the job seeker user does not have an interest;
at least one module configured to process the at least one word or text phrase classified by the job seeker user to derive and store words or root forms or synonyms corresponding to the at least one word or text phrase classified by the job seeker user, wherein the processing processes at least one first-type word or text phrase to derive and store a first set of words or root forms or synonyms corresponding to the at least one first-type word or text phrase and processes the at least one second-type word or text phrase to derive and store a second set of words or root forms or synonyms corresponding to the at least one second-type word or text phrase;

at least one module configured to rank a set of job openings that belong to the plurality of job openings based upon scores generated for each job opening of the set of job openings, wherein the score for a given job opening is generated by matching the words or root forms or synonyms corresponding to the at least one word or text phrase classified by the job seeker user to the words or root forms or synonyms corresponding to the job descriptor data of the given job opening, wherein the score for the given job opening is based upon a first frequency and a second frequency, wherein the first frequency represents frequency of the first set of words or root forms or synonyms in the words or root forms or synonyms corresponding to the job descriptor data of the given job opening, wherein the second frequency represents frequency of the second set of words or root forms or synonyms in the words or root forms or synonyms corresponding to the job descriptor data of the given job opening, wherein the first frequency contributes to an increase in the score for the given job opening, and wherein the second frequency contributes to a decrease in the score for the given job opening; and at least one module configured to present to the job seeker user information pertaining to the set of job openings in an order based on the ranked set of job openings for display and viewing by the job seeker user.

9. A system according to claim 8, wherein:
the at least one computer processor further include at least one module configured to interact with the job seeker user to select a particular job opening belonging to the set of job openings for review by the job seeker user.

10. A system according to claim 8, wherein:
the job-descriptor data for a given job opening represents words or text phrases related to the given job opening.

11. A system according to claim 8, wherein:
the job seeker user classifies a particular word or text phrase of the job descriptor data as one of the first-type and the second-type by performing a pre-defined swipe gesture associated with the particular word or text phrase of the job descriptor.

* * * * *